US011639202B2

(12) United States Patent
Saroha et al.

(10) Patent No.: US 11,639,202 B2
(45) Date of Patent: May 2, 2023

(54) TRUCK OR TRACTOR VEHICLE WITH ADJUSTABLE PANHARD BAR AND METHOD FOR ADJUSTING ALIGNMENT OF A TRUCK OR TRACTOR VEHICLE CAB RELATIVE TO A TRUCK OR TRACTOR VEHICLE FRAME

(71) Applicant: VOLVO TRUCK CORPORATION, Gothenburg (SE)

(72) Inventors: Lalit Saroha, Summerfield, NC (US); Mahesh Boraiah, Bangalore (IN); Michael Fricker, Pulaski, VA (US); Matthew Knerr, Nazareth, PA (US); Raymond Jackovitz, Slatington, PA (US); Brian Southern, Stokesdale, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 1 day.

(21) Appl. No.: 17/085,163

(22) Filed: Oct. 30, 2020

(65) Prior Publication Data

US 2022/0135148 A1    May 5, 2022

(51) Int. Cl.
*B62D 33/06* (2006.01)
*B62D 65/04* (2006.01)
*B62D 33/08* (2006.01)

(52) U.S. Cl.
CPC ......... *B62D 33/0604* (2013.01); *B62D 33/08* (2013.01); *B62D 65/04* (2013.01)

(58) Field of Classification Search
CPC ............................ B62D 33/06; B62D 33/0604; B62D 33/0608; B62D 33/08; B62D 65/12

USPC ........................................ 296/190.01, 190.07
See application file for complete search history.

(56) References Cited

U.S. PATENT DOCUMENTS

| 4,053,170 | A  | 10/1977 | Hyler et al. |
| 5,553,911 | A  | 9/1996  | Bodin et al. |
| 6,206,422 | B1 | 3/2001  | Goddard |
| 6,726,272 | B1 | 4/2004  | Puterbaugh et al. |
| 6,758,294 | B2 | 7/2004  | Peddycord et al. |
| 7,077,226 | B2 | 7/2006  | Oliver et al. |
| 7,077,227 | B2 | 7/2006  | Oliver et al. |

(Continued)

FOREIGN PATENT DOCUMENTS

GB    2244745 A * 12/1991  ......... B62D 33/0604

OTHER PUBLICATIONS

Goodman, What is an Adjustable Panhard Bar (dated Feb. 5, 2020) C.J. Pony Parts website https://www.cjponyparts.com/resources/what-is-an-adjustable-panhard-bar.

(Continued)

*Primary Examiner* — Jason S Daniels
(74) *Attorney, Agent, or Firm* — WRB-IP PLLC

(57) ABSTRACT

A truck or tractor vehicle includes a frame having a longitudinal centerline, an operator cab mounted relative to the frame via a cab suspension, the cab having a longitudinal centerline, the cab suspension comprising a front suspension and a rear suspension, the rear suspension comprising an adjustable panhard bar attached at a first end to the cab and attached at a second end to the frame, the adjustable panhard bar being adjustable in length to position the longitudinal centerline of the cab at a desired angle relative to the longitudinal centerline of the frame.

20 Claims, 6 Drawing Sheets

(56) References Cited

U.S. PATENT DOCUMENTS

| | | | |
|---|---|---|---|
| 8,459,773 B2 | 6/2013 | Tempelman et al. | |
| 8,696,002 B1* | 4/2014 | Batdorff | B60G 9/00 |
| | | | 280/5.509 |
| 8,807,633 B2* | 8/2014 | Milburn | B62D 55/065 |
| | | | 296/190.07 |
| 2007/0267894 A1 | 11/2007 | Van Den Brink et al. | |
| 2009/0001677 A1* | 1/2009 | Wilson | B60G 9/027 |
| | | | 280/5.511 |
| 2009/0302640 A1* | 12/2009 | Murray | B62D 33/0608 |
| | | | 296/190.07 |
| 2012/0098227 A1 | 4/2012 | Holst et al. | |
| 2013/0313858 A1* | 11/2013 | Rager | B62D 33/0608 |
| | | | 296/190.07 |
| 2015/0307140 A1* | 10/2015 | Scott | B62D 24/04 |
| | | | 296/190.07 |
| 2019/0100255 A1 | 4/2019 | Benevelli et al. | |
| 2020/0070899 A1* | 3/2020 | Keller | B62D 55/065 |

OTHER PUBLICATIONS

European Search Report (dated Jun. 2, 2022) for corresponding European App. EP 21 19 6516.

* cited by examiner

TRUCK OR TRACTOR VEHICLE WITH ADJUSTABLE PANHARD BAR AND METHOD FOR ADJUSTING ALIGNMENT OF A TRUCK OR TRACTOR VEHICLE CAB RELATIVE TO A TRUCK OR TRACTOR VEHICLE FRAME

BACKGROUND AND SUMMARY

The present invention relates to truck or tractor vehicles with an adjustable panhard bar and methods related to such vehicles.

When building trucks, a cab is typically mounted to a frame via a cab suspension that supports the cab proximate four corners of the cab. The suspension usually includes springs and dampers at each corner. A panhard bar is typically provided in connection with a rear portion of the suspension to resist lateral motion, provide stiffness to the cab suspension, and restrain the cab from detaching from the frame in the event of an accident.

As a result of variations from standard dimensions in cabs and frames due to, for example, permissible manufacturing tolerances, it is possible that a cab may not be properly oriented relative to the frame. For example, if the cab and frame design is such that wind resistance is minimized and/or fuel economy is maximized by a particular cab and frame orientation, such as by having longitudinal centerlines of the cab and frame aligned, a misalignment may increase wind resistance and/or be detrimental to fuel economy.

In addition to orientations of cab and frame that are less than optimal as the result of, e.g., manufacturing tolerances, the cab and frame may move from a desired orientation to a less desirable orientation after a period of use, such as due to wear to springs or other components.

It is desirable to provide a way to correct the position a truck or tractor vehicle cab relative to a frame to place them in a desired angular orientation in spite of manufacturing tolerances, wear, or other factors that result in the cab and frame being oriented in a less than optimal manner. It is also desirable to be able to correct the position of the cab relative to the frame in a simple, inexpensive manner.

According to an aspect of the present invention, a truck or tractor vehicle comprises a frame having a longitudinal centerline, an operator cab mounted relative to the frame via a cab suspension, the cab having a longitudinal centerline, the cab suspension comprising a front suspension and a rear suspension, the rear suspension comprising an adjustable panhard bar attached at a first end to the cab and attached at a second end to the frame, the adjustable panhard bar being adjustable in length to position the longitudinal centerline of the cab at a desired angle relative to the longitudinal centerline of the frame.

According to another aspect of the present invention, a method for attaching a frame and an operator cab of a truck or tractor vehicle, the frame having a longitudinal centerline and the cab having a longitudinal centerline, comprises mounting the cab relative to the frame via a cab suspension, the cab suspension comprising a front suspension and a rear suspension, the rear suspension comprising an adjustable panhard bar attached at a first end to the cab and attached at a second end to the frame, the adjustable panhard bar being adjustable in length, and adjusting a length of the adjustable panhard bar to position the longitudinal centerline of the cab at a desired angle relative to the longitudinal centerline of the frame.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
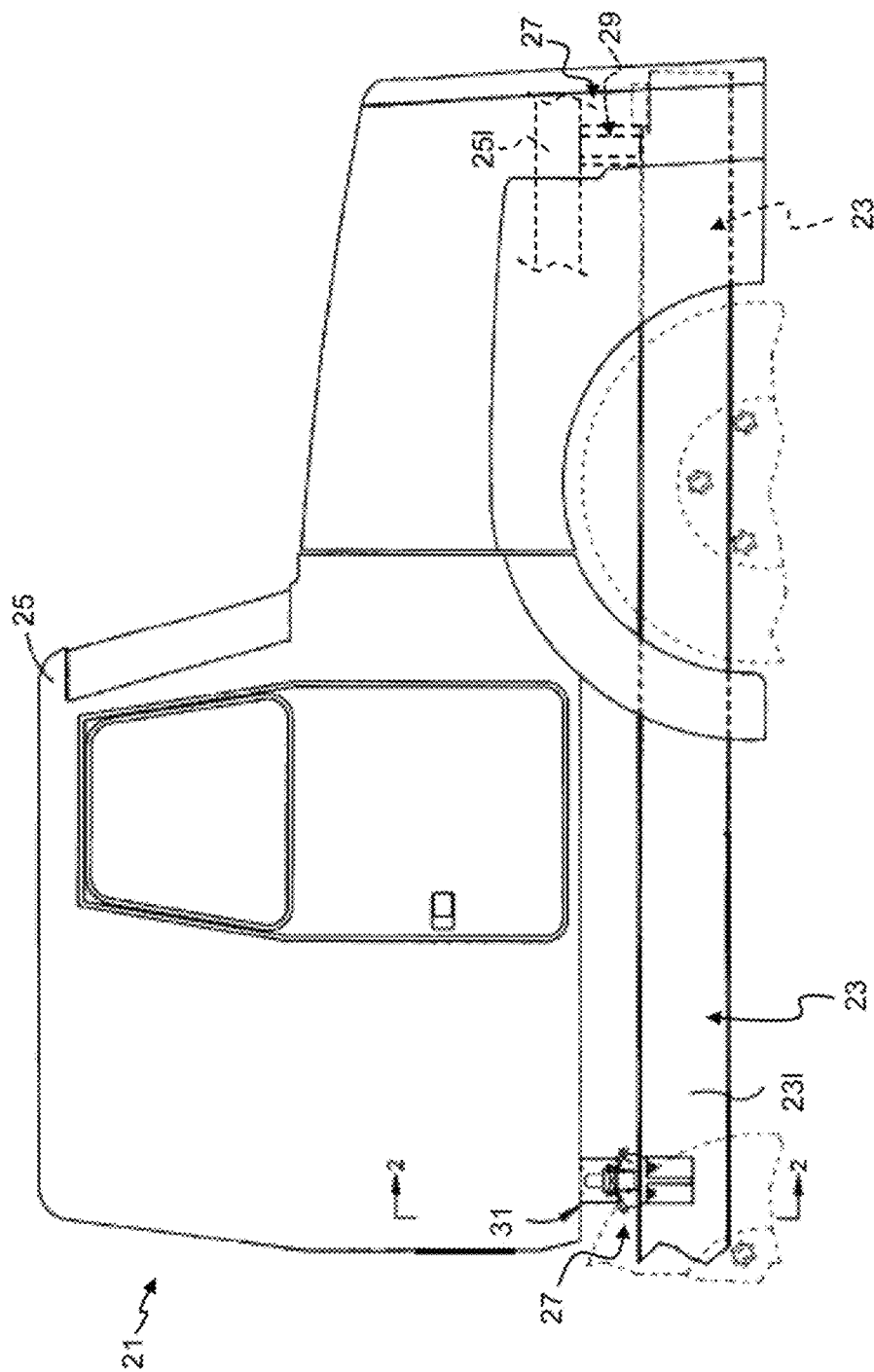
FIG. 1 is a partial, side view of a truck or tractor vehicle according to an aspect of the invention.
Figure 4:
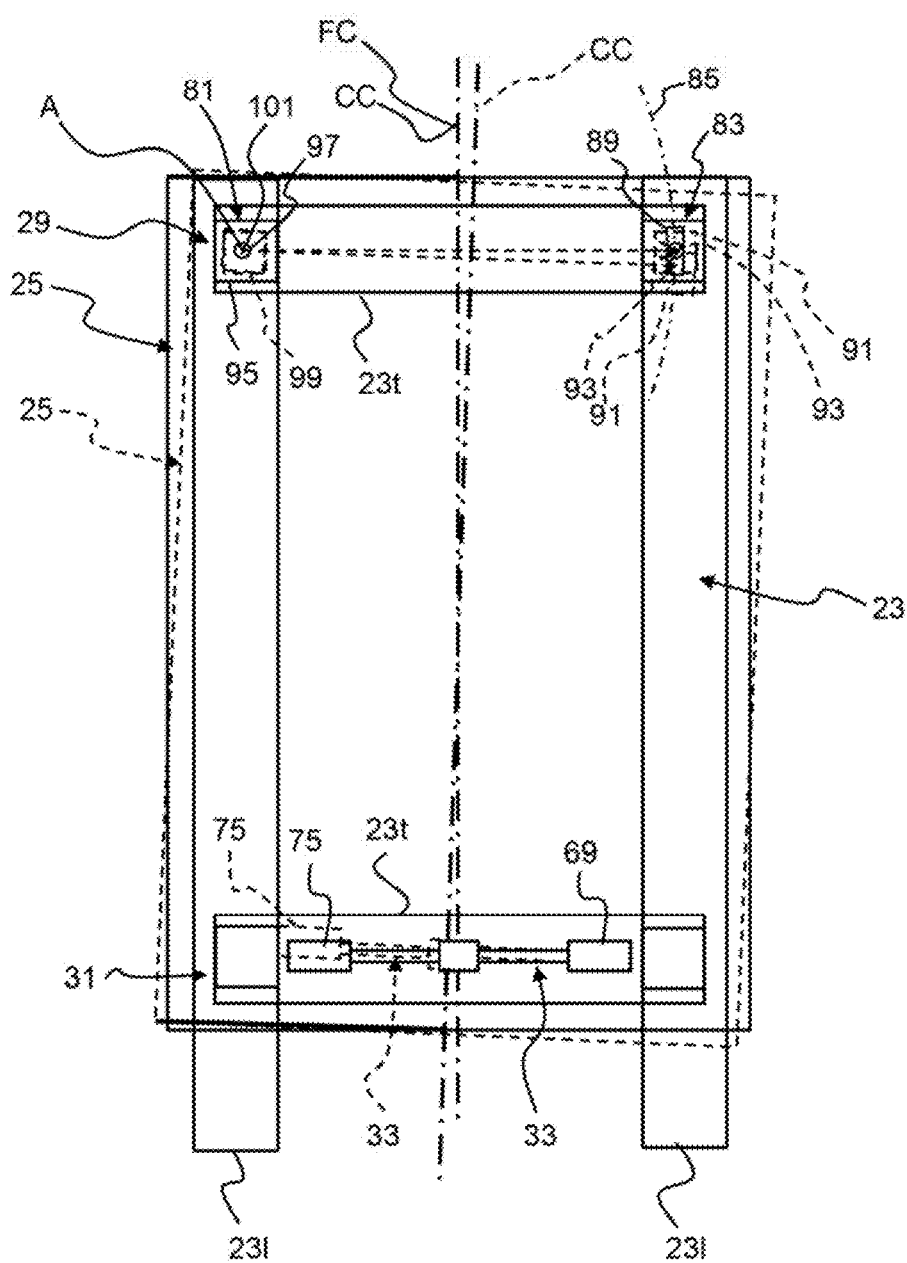
FIG. 4 schematically shows adjustment of alignment of a truck or tractor vehicle cab relative to a truck or tractor vehicle frame.
Figure 5:
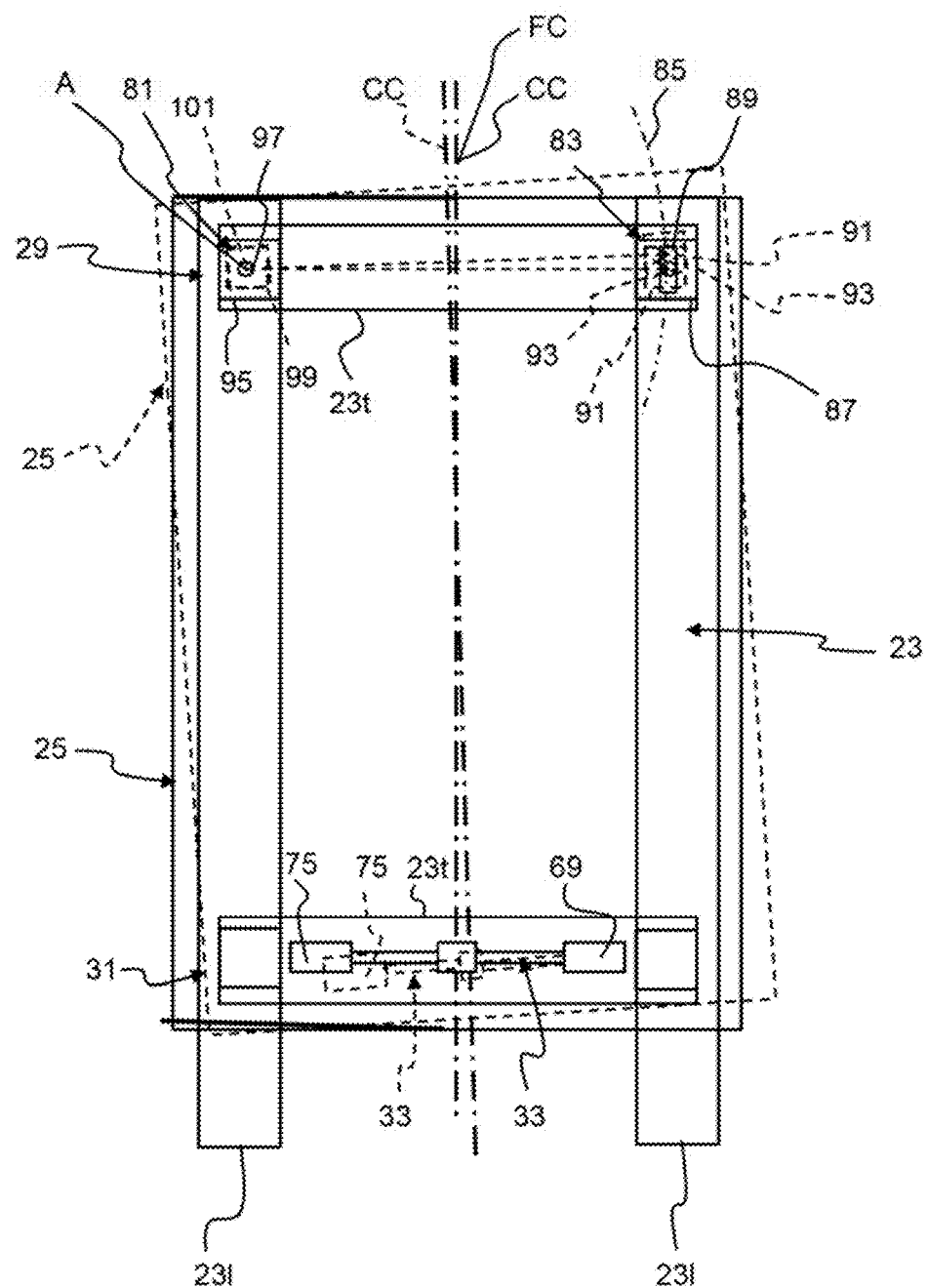
FIG. 5 schematically shows adjustment of alignment of a truck or tractor vehicle cab relative to a truck or tractor vehicle frame in a direction opposite to that shown in FIG. 4.

A truck or tractor vehicle 21 according to an aspect of the present invention is shown in FIG. 1 and a frame 23 having a longitudinal centerline CF (FIGS. 4 and 5) and an operator cab 25 mounted relative to the frame via a cab suspension 27, the cab having a longitudinal centerline CC (FIGS. 4 and 5). The cab suspension 27 comprises a front suspension 29 and a rear suspension 31. As seen, for example, in FIG. 2, the frame 23 typically comprises longitudinal portions (rails) 23*l* and transverse portions (cross members) 23*t* extending between the rails. The cab 25, likewise, typically comprises longitudinal portions cab rails) 25*l* and transverse portions (cab cross members) 25*t* extending between the cab rails.

Figure 2:
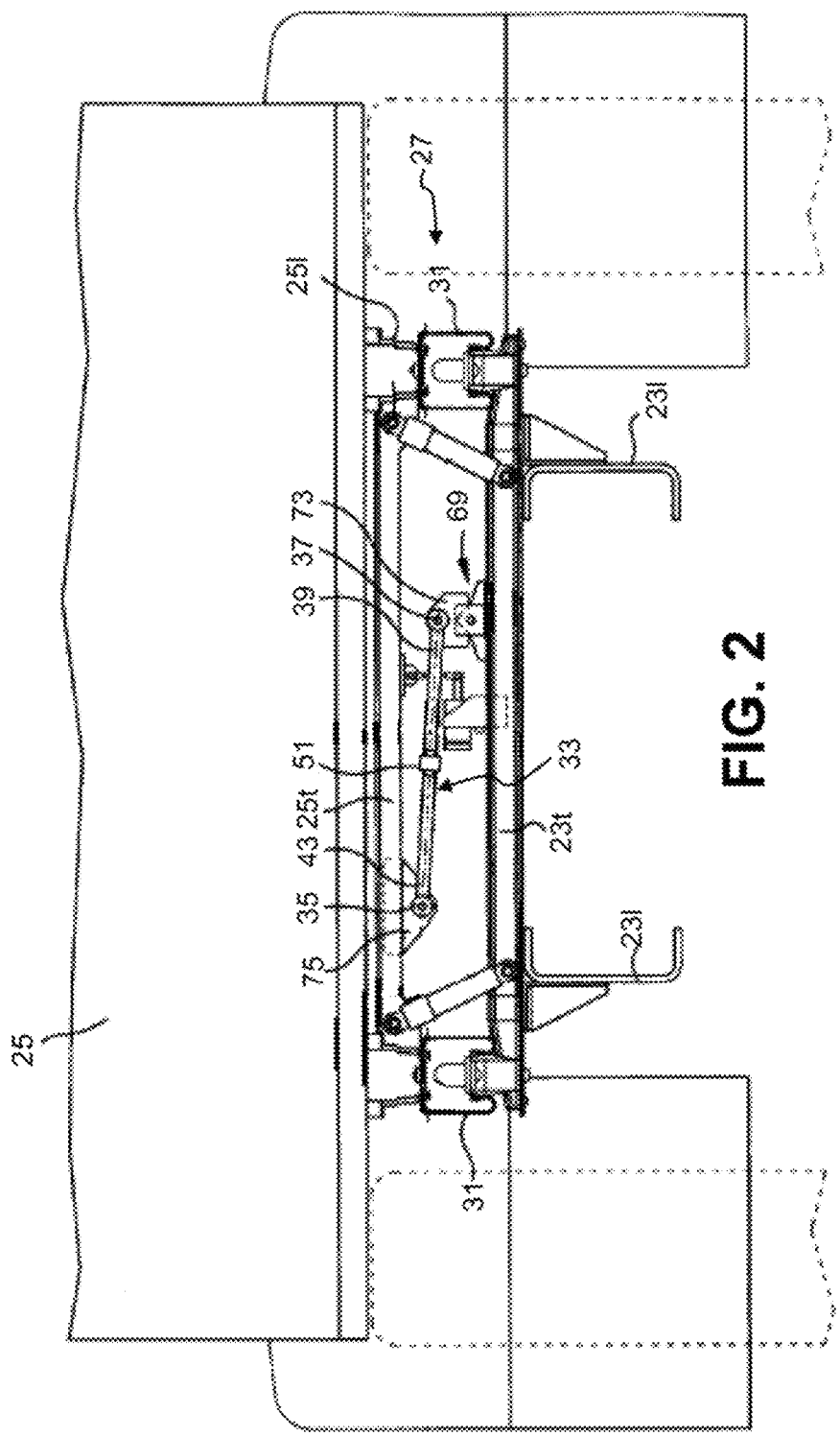
FIG. 2 is partially cross-sectional view of the truck or tractor vehicle of FIG. 1 taken at section 2-2.

As seen, for example, in FIG. 2, the rear suspension 31 comprises an adjustable panhard bar 33 attached at a first end 35 to the cab 25 and attached at a second end 37 to a cross member 23*t* of the frame 23. The adjustable panhard bar 33 is adjustable in length to position the longitudinal centerline CC of the cab 25 at a desired angle relative to the longitudinal centerline CF of the frame 23 as seen in FIGS. 4 and 5. The adjustable panhard bar 33 may be attached to one of the frame 23 and the cab 25 via a bracket or a suitable damping arrangement, such as the spring arrangement disclosed in U.S. Pat. No. 6,758,294, which is incorporated by reference. In addition to the adjustable panhard bar 33, the front suspension 29 and the rear suspension 31 will ordinarily include spring and damping members, such as shown in U.S. Pat. No. 6,758,294, at at least the rear two and, ordinarily, at all four corners of the cab 25.

The adjustable panhard bar 33 is ordinarily adjusted in length to position the longitudinal centerline CC of the cab 25 at a desired angle relative to the longitudinal centerline CF of the frame 23 so that wind resistance of the truck or tractor vehicle 21 is minimized and/or fuel economy is maximized. Ordinarily, wind resistance of the truck or tractor vehicle 21 is minimized and fuel economy is maximized by adjusting the adjustable panhard bar 33 in length to align the longitudinal centerline CC of the cab 25 and the longitudinal centerline CF of the frame 23.

Figure 3:
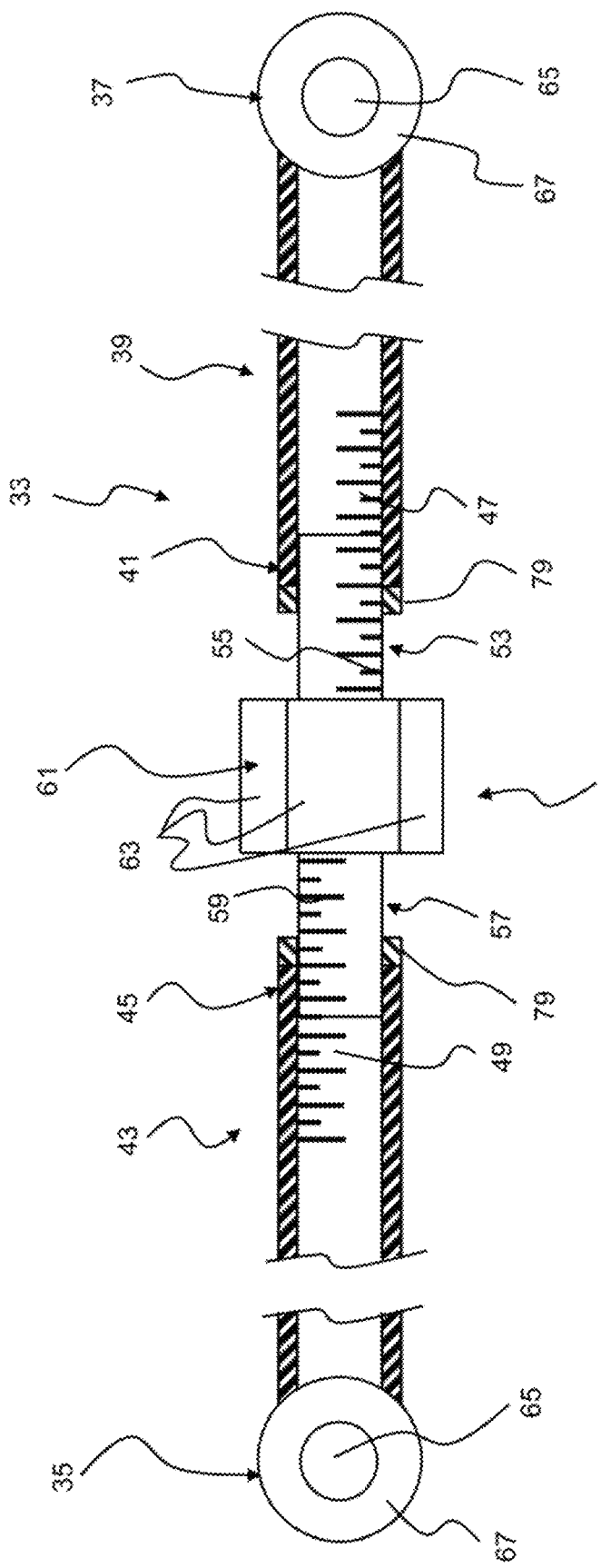
FIG. 3 is a partially cross-sectional view of an embodiment of an adjustable panhard bar according to an aspect of the present invention.

As seen, for example, in FIG. 3, ordinarily, the adjustable panhard bar 33 comprises a first bar component 39 having a first end attachable to the frame 23 and a threaded second end 41. The first end of the first bar component 39 is ordinarily the second end 37 of the adjustable panhard bar 33. The adjustable panhard bar 33 ordinarily further comprises a second bar component 43 having a first end attachable to the cab 25 and a threaded second end 45. The first end of the second bar component 43 is ordinarily the first end 35 of the adjustable panhard bar.

Figure 6:
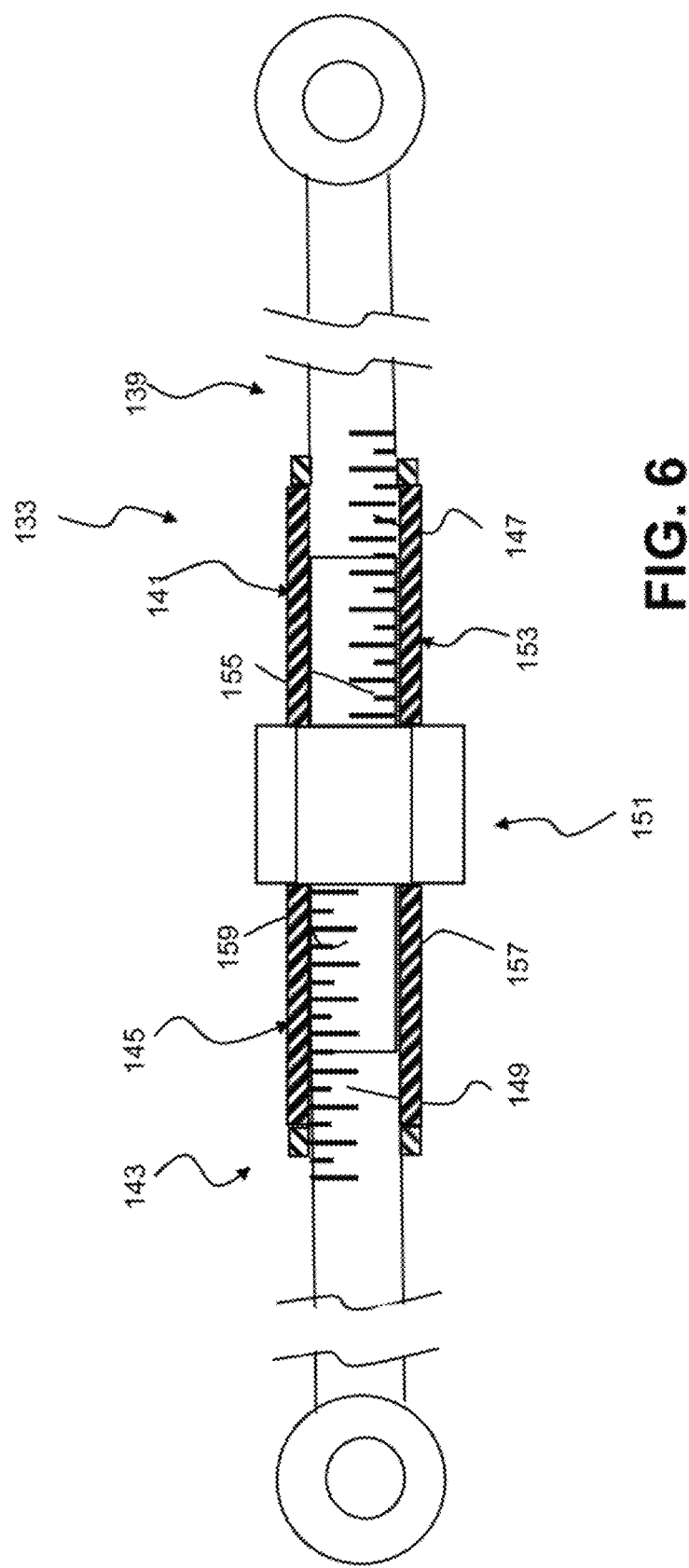
FIG. 6 is a partially cross-sectional view of another embodiment of an adjustable panhard bar according to an aspect of the present invention.

The threaded second end 41 of the first bar component 39 ordinarily has a first thread 47 having a first hand (e.g., left-hand), and the threaded second end 45 of the second bar component 41 ordinarily has a second thread 49 having a second hand opposite the first hand (e.g., right-hand). A linking member 51 is provided and ordinarily has a first threaded end 53 with a thread 55 that mates with the threaded second end 41 of the first bar component 39 and a second threaded end 57 with a thread 59 that mates with the threaded second end 45 of the second bar component 43. Ordinarily, the first and second threads 47 and 49 at the second threaded ends 41 and 45 of the first and second bar components 39 and 43, respectively, are internal, or female, threads and the threads 55 and 59 at the first and second threaded ends 53 and 57 of the linking member 51 are external, or male, threads. As seen in FIG. 6, it is, of course, also possible to provide a panhard bar 133 on which the first and second threads 147 and 149 at the second threaded ends 141 and 145 of the first and second bar components 139 and 143 are external threads and the first and second threads 155 and 159 at the first and second threaded ends 153 and 157 of the linking member 151 are internal threads. It is also possible to have one of the first and second threads at the second threaded end of the first and second bar components be an external thread and the other an internal thread, and mating ones of the first and second threads at the first and second threaded ends of the linking member be an internal thread and the other an external thread.

The linking member 51 ordinarily further comprises a central, unthreaded portion 61. The central, unthreaded portion 61 ordinarily includes at least two opposite, longitudinally extending parallel surfaces 63, such as surfaces on a square or hexagonal shape, for facilitating gripping by a conventional wrench or automatic tool. Depending upon which way the linking member 51 is turned relative to the stationary first bar component 39 and the stationary second bar component 43, the length of the panhard bar 33 will increase or decrease because of the provision of the first thread 47 and the second thread 49 on the first and second bar components (and because of the threads 55 and 59 on the linking member) having opposite hands.

Ordinarily, the first end of the first bar component 39 (i.e. the second end 37 of the adjustable panhard bar 33) and the first end of the second bar component 43 (i.e. the first end 35 of the adjustable panhard bar) each comprises a hole 65 and a bushing 67 in the hole. As seen, for example, in FIG. 2, the second end 37 of the adjustable panhard bar 33 will ordinarily be attached to a suitable bracket arrangement 69 (such as the bracket arrangement shown in U.S. Pat. No. 6,758,294 that includes a damping component, however, the bracket arrangement need not include a damping component) on the frame 23 via a pin or bolt extending through the bushing 67 on the first end of the adjustable panhard bar and through a hole in a flange 73 on the bracket arrangement, and the first end 35 of the adjustable panhard bar 33 will be attached to a suitable bracket arrangement or frame portion 75 on the cab 25 via a pin or bolt through the bushing 67 on the second end of the adjustable panhard bar and through a hole in the bracket arrangement or frame portion on the cab. The adjustable panhard bar 33 further ordinarily comprises means, such as jam nuts 79, for locking the linking member 51 in position relative to the first bar component 39 and the second bar component 43.

As seen, for example, in FIGS. 4 and 5, the front suspension 29 can comprise a first bracket arrangement 81 on a first (e.g., left) side of the cab 25 and a second bracket arrangement 83 on a second (e.g., right) side of the cab. The first bracket arrangement 81 can be configured to permit pivotal movement of the cab 25 relative to the frame 23 around an axis A, and the second bracket arrangement 83 can be configured to permit movement of the cab along an arc 85 of a circle relative to the frame, the circle having its center at the axis A. In this way, as the length of the adjustable panhard bar changes, the cab 25 can pivot about the axis A. It will be appreciated that FIGS. 4 and 5 exaggerate the typical extent of adjustment that will be provided via the adjustable panhard bar 33. Ordinarily, the panhard bar 33 will be adjustable in length only a small amount (e.g., about ½ inch or 10 mm) relative to the size of the frame 23 and cab 25, and the angle of the cab centerline CC relative to the frame centerline CF will also ordinarily only be adjustable a small amount, usually less than 1 degree. For example, in a presently preferred embodiment, an angular adjustment of about 0.2 degrees of the cab centerline CC relative to the frame centerline CF will result in a lateral shift of about 10.5 mm of the rear end of the cab 25 relative to the frame 23. Of course, if desired, the panhard bar 33 can be constructed to permit substantially greater changes in length, and substantially greater angular adjustment.

The second bracket arrangement 83 can comprise a first component 87 of the second bracket arrangement with a vertically extending elongated hole 89 therein. The first component 87 of the second bracket arrangement 83 will ordinarily be fixed to the frame 23 by any suitable means, such as welding, bolts, etc. The second bracket arrangement 83 can further comprise a second component 91 (shown in phantom) of the second bracket arrangement comprising a pin 93 (shown in phantom) fixed to the cab 25 by any suitable means (such as welding, bolts, etc.) and disposed in the elongated hole 89. The elongated hole 89 can be elongated to permit movement of the cab 23 along the arc 85 of the circle relative to the frame 25 as the length of the adjustable panhard bar 33 is changed. The elongated hole 89 may be in the shape of an arc.

After the adjustable panhard bar 33 is adjusted so that the centerline CC of the cab 23 is at a desired angular orientation relative to the centerline CF of the frame, the first and second components 87 and 91 of the second bracket arrangement 83 will ordinarily be locked relative to each other, such as by a bolt on a threaded end of the pin 93 that fixes the pin relative to the elongated hole 89.

The first bracket arrangement 81 comprises a first component 95 of the first bracket arrangement with a vertically extending hole 97 therein. The first component 95 of the first bracket arrangement 81 will ordinarily be fixed to the frame 23 by any suitable means, such as welding, bolts, etc. The first bracket arrangement 81 can further comprise a second component 99 of the first bracket arrangement comprising a pin 101 fixed to the cab 25 by any suitable means (such as welding, bolts, etc.) and disposed in the hole 97. The hole 97 will ordinarily be substantially circular and slightly larger in diameter than the pin 101 such that substantially only pivoting movement of the cab 25 relative to the frame 23 about the axis A centered in the hole 97 and pin 101 is permitted when the length of the adjustable panhard bar 33 is changed. The pin 101 will typically include a threaded end so that the first and second bracket components 95 and 99 can be bolted in place after the adjustable panhard bar 33 is adjusted so that the centerline CC of the cab 23 is at a desired angular orientation relative to the centerline CF of the frame.

In a method of the invention for attaching a frame 23 and an operator cab 25 of a truck or tractor vehicle 21, as seen in FIGS. 4 and 5, the frame has a longitudinal centerline CF and the cab has a longitudinal centerline CC. The cab 25 is mounted relative to the frame 23 via a cab suspension 27, the cab suspension comprising a front suspension 29 and a rear suspension 31. The rear suspension 31 comprises an adjustable panhard bar 33 attached at a first end 35 to the cab 25 and attached at a second end 37 to the frame 23, the adjustable panhard bar being adjustable in length.

The method further comprises adjusting a length of the adjustable panhard bar 33 to position the longitudinal centerline CC of the cab 25 at a desired angle (usually but not necessarily a zero degree angle) relative to the longitudinal centerline CF of the frame 23. For example, FIG. 4 shows the centerline CF of the frame 23 and the centerline CC of the cab 25 (cab shown via solid lines aligned when the panhard bar 33 is at a first length (shown via solid lines) and with the cab (shown via dashed lines) and the centerline of the cab rotated clockwise about the axis A and not aligned with the centerline of the frame when the panhard bar is at a longer second length (shown via dashed lines). Similarly, FIG. 5 shows the centerline CF of the frame 23 and the centerline CC of the cab 25 (cab shown via, solid lines) aligned when the panhard bar 33 is at a first length (shown via solid lines) and with the cab (shown via dashed lines) and the centerline of the cab rotated counter-clockwise about the axis A and not aligned with the centerline of the frame when the panhard bar is at a shorter second length (shown via dashed lines). It will be appreciated that the centerline CF of frame 23 and the centerline CC of the cab 25 will not necessarily be aligned when the pin 93 is in the center of the elongated hole 89 as illustrated and that aligning the centerlines may involve adjusting the panhard bar 33 to rotate the cab about the axis so that the pin is moved toward one end or the other of the elongated hole.

The adjustable panhard bar 33 may be adjusted in length to position the longitudinal centerline CC of the cab 25 relative to the longitudinal centerline CF of the frame 23 so that wind resistance of the truck or tractor vehicle is minimized. Minimizing resistance of the truck or tractor vehicle 21 will ordinarily be achieved by adjusting the adjustable panhard bar 33 in length to align the longitudinal centerline CC of the cab 25 relative to the longitudinal centerline CF of the frame 23. The adjustable panhard bar 33 may, alternatively or at the same time, be adjusted in length to position the longitudinal centerline CC of the cab 25 relative to the longitudinal centerline CF of the frame 23 so that fuel economy of the vehicle 21 is improved. Ordinarily, fuel economy will be improved as wind resistance is decreased. While it will ordinarily be desirable to align the longitudinal centerline CC of the cab 25 and the longitudinal centerline CF of the frame 23 to, inter alia, minimize wind resistance and improve fuel economy, there may be situations where it is desired to misalign the centerlines, and this is also possible via the present invention.

The truck or tractor vehicle and method according to the present invention facilitates correcting the positioning of a cab relative to a frame during manufacturing or after use. Because the correction can be accomplished via only a few bolt loosenings and tightenings, it can be achieved in a simple and inexpensive manner.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A truck or tractor vehicle, comprising:
   a frame having a longitudinal centerline;
   an operator cab mounted relative to the frame via a cab suspension, the cab having a longitudinal centerline;
   the cab suspension comprising a front suspension and a rear suspension, the rear suspension comprising an adjustable panhard bar attached at a first end to the cab and attached at a second end to the frame, the adjustable panhard bar being adjustable in length to position the longitudinal centerline of the cab at a desired angle relative to the longitudinal centerline of the frame.

2. The truck or tractor vehicle as set forth in claim 1, wherein the adjustable panhard bar is adjusted in length to position the longitudinal centerline of the cab at a desired angle relative to the longitudinal centerline of the frame so that wind resistance of the truck or tractor vehicle is minimized.

3. The truck or tractor vehicle as set forth in claim 2, wherein wind resistance of the truck or tractor vehicle is minimized by adjusting the adjustable panhard bar in length to align the longitudinal centerline of the cab and the longitudinal centerline of the frame.

4. The truck or tractor vehicle as set forth in claim 1, wherein the adjustable panhard bar is adjusted in length to align the longitudinal centerline of the cab and the longitudinal centerline of the frame.

5. The truck or tractor vehicle as set forth in claim 1, wherein the adjustable panhard bar comprises
   a first bar component having a first end attachable to the frame and a threaded second end,
   a second bar component having a first end attachable to the cab and a threaded second end, the threaded second end of the first bar component having a first thread having a first hand, and the threaded second end of the second bar component having a second thread having a second hand opposite the first hand, and
   a linking member having a first threaded end that mates with the threaded second end of the first bar component and a second threaded end that mates with the threaded second end of the second bar component.

6. The truck or tractor vehicle as set forth in claim 5, wherein the first threaded end and the second threaded end of the linking member are male threaded members.

7. The truck or tractor vehicle as set forth in claim 5, wherein the linking member comprises a central, unthreaded portion.

8. The truck or tractor vehicle as set forth in claim 7, wherein the central, unthreaded portion includes at least two opposite, longitudinally extending parallel surfaces.

9. The truck or tractor vehicle as set forth in claim 5, wherein the first end of the first bar component and the first end of the second bar component each comprises a hole and a bushing in the hole.

10. The truck or tractor vehicle as set forth in claim 5, wherein the adjustable panhard bar comprises means for locking the linking member in position relative to the first bar component and the second bar component.

11. The truck or tractor vehicle as set forth in claim 1, wherein the front suspension comprises a first bracket arrangement on a first side of the cab and a second bracket arrangement on a second side of the cab, the first bracket arrangement being configured to permit pivotal movement of the cab relative to the frame around an axis, and the second bracket arrangement being configured to permit movement of the cab along an arc of a circle relative to the frame.

12. The truck or tractor vehicle as set forth in claim 11, wherein the second bracket arrangement comprises a first component of the second bracket arrangement with a vertically extending hole therein, the first component of the second bracket arrangement being fixed to the frame, and a second component of the second bracket arrangement comprising a pin fixed to the cab and disposed in the hole, the hole being elongated to permit movement of the cab along the arc of the circle relative to the frame.

13. The truck or tractor vehicle as set forth in claim 12, wherein the first bracket arrangement comprises a first component of the first bracket arrangement with a vertically extending hole therein, the first component of the first bracket arrangement being fixed to the frame, and a second component of the first bracket arrangement comprising a pin disposed in the hole, the hole being substantially circular such that substantially only pivoting movement of the cab relative to the frame is permitted.

14. A method for attaching a frame and an operator cab of a truck or tractor vehicle, the frame having a longitudinal centerline and the cab having a longitudinal centerline, comprising:
    mounting the cab relative to the frame via a cab suspension, the cab suspension comprising a front suspension and a rear suspension, the rear suspension comprising an adjustable panhard bar attached at a first end to the cab and attached at a second end to the frame, the adjustable panhard bar being adjustable in length; and
    adjusting a length of the adjustable panhard bar to position the longitudinal centerline of the cab at a desired angle relative to the longitudinal centerline of the frame.

15. The method as set forth in claim 14, comprising adjusting the adjustable panhard bar in length to position the longitudinal centerline of the cab relative to the longitudinal centerline of the frame so that wind resistance of the truck or tractor vehicle is minimized.

16. The method as set forth in claim 15, comprising minimizing wind resistance of the truck or tractor vehicle by adjusting the adjustable panhard bar in length to align the longitudinal centerline of the cab and the longitudinal centerline of the frame.

17. The method as set forth in claim 14, comprising adjusting the adjustable panhard bar in length to align the longitudinal centerline of the cab and the longitudinal centerline of the frame.

18. The method as set forth in claim 14, comprising adjusting the adjustable panhard bar in length to position the longitudinal centerline of the cab relative to the longitudinal centerline of the frame so that fuel economy of the vehicle is improved.

19. The method as set forth in claim 14, wherein the front suspension comprises a first bracket arrangement on a first side of the cab and a second bracket arrangement on a second side of the cab, the first bracket arrangement being configured to permit pivotal movement of the cab relative to the frame around an axis, and the second bracket arrangement being configured to permit movement of the cab along an arc of a circle relative to the frame, the method comprising, while adjusting the length of the adjustable panhard bar, pivoting the cab about the axis.

20. The method as set forth in claim 19, wherein the second bracket arrangement comprises a first component of the second bracket arrangement with a vertically extending hole therein, the first component of the second bracket arrangement being fixed to the frame, and a second component of the second bracket arrangement comprising a pin fixed to the cab and disposed in the hole, the hole being elongated to permit movement of the cab along the arc of the circle relative to the frame, the method comprising, while pivoting the cab about the axis, moving the pin in the hole.

* * * * *